US005808602A

United States Patent [19]
Sellers

[11] Patent Number: 5,808,602
[45] Date of Patent: Sep. 15, 1998

[54] ROTARY CURSOR POSITIONING APPARATUS

[75] Inventor: Charles A. Sellers, Houston, Tex.

[73] Assignee: Compaq Computer Corporation, Houston, Tex.

[21] Appl. No.: 616,661

[22] Filed: Mar. 15, 1996

[51] Int. Cl.$^6$ .................................................. G09G 5/08
[52] U.S. Cl. ........................ 345/157; 345/159; 345/184
[58] Field of Search ............................. 345/157, 156, 345/184, 163, 159, 160, 164, 165, 166, 167, 168, 169, 145, 146; 74/471 XY

[56] References Cited

U.S. PATENT DOCUMENTS

| | | | |
|---|---|---|---|
| 4,719,455 | 1/1988 | Louis | 345/184 |
| 4,766,423 | 8/1988 | Ono et al. | 345/159 |
| 4,812,829 | 3/1989 | Ebina et al. | 345/159 |
| 4,910,503 | 3/1990 | Brodsky | 345/184 |
| 4,933,670 | 6/1990 | Wislocki | 345/184 |
| 5,563,629 | 10/1996 | Capara | 345/184 |
| 5,627,531 | 5/1997 | Posso et al. | 345/184 |

*Primary Examiner*—Xiao Wu
*Attorney, Agent, or Firm*—Konneker & Smith

[57] ABSTRACT

A portable computer is provided with a rotary display screen cursor position control device that includes a rotatably supported disc member that has a radially extending depression formed in an exposed outer side surface thereof. To reposition the display screen cursor, the computer user places a finger in the depression and rotates the disc until the radially outer end of the depression points in a direction corresponding to the desired cursor repositioning movement direction, with the finger being placed at a radial position in the depression corresponding to the cursor repositioning velocity—a radially outer end portion of the depression corresponding to the highest selectable cursor velocity, and a radially inner end portion thereof corresponding to the lowest selectable cursor velocity. Position sensing circuitry underlying the rotatable disc senses the rotational orientation of the disc, and the radial position of the user's finger in its depression, and responsively generates an output signal useable to reposition the display screen cursor in the selected direction and at the selected velocity.

17 Claims, 2 Drawing Sheets

ROTARY CURSOR POSITIONING APPARATUS

BACKGROUND OF THE INVENTION

1. Field of the Invention

The present invention generally relates to electronic devices, such as computers, and, in a preferred embodiment thereof, more particularly relates to apparatus for controlling the position of a cursor on a computer display screen.

2. Description of Related Art

A personal computer is typically provided with the ability to display a moveable cursor icon on its display screen. Selectively variable movement of the cursor is typically achieved using a cursor positioning device adapted to receive a manual input from the computer user, indicative of both the direction and velocity of the desired cursor repositioning on the screen, and responsively transmit to the display control electronics of the computer an appropriate combination direction/velocity cursor repositioning signal.

In portable computers, particular the diminutive notebook computer, two types of cursor control devices are becoming increasingly popular—the pointing stick and the touch pad. These devices may be physically integrated with their associated computer, or may be of the "stand alone" type in which the particular cursor control device is physically separate from its associated computer.

The pointing stick is of a miniature "joy stick" configuration and is typically positioned in an upright orientation in a central portion of the computer keyboard, between a plurality of its spaced apart key members, with the top end of the pointing stick being vertically located in a manner permitting it to be engaged by a finger of the keyboard user. The bottom end of the pointing stick overlies and engages a pressure sensitive electronic circuit structure which, in turn, is coupled to the cursor position control circuitry of the computer.

To reposition the display screen cursor, the user engages the upper end of the pointing stick with his finger with a force having a direction corresponding to the cursor movement direction, and a magnitude directly related to the desired cursor repositioning velocity-i.e., a low force indicating a relatively low desired cursor repositioning velocity, and a greater force indicating a higher desired velocity. The pressure sensitive circuitry senses the direction and magnitude of the finger force, and responsively transmits to the cursor position control circuitry a combination direction/velocity cursor repositioning signal.

The touch pad is basically a flat plate structure externally mounted on a conveniently accessible portion of the computer and overlying capacitance-based position sensing circuitry. To operate the touch pad, the computer user simply touches the pad with his finger and slides his finger along the pad in the direction he wants the cursor to move on the display screen, and at a velocity corresponding to the quickness that he wants the cursor to move. The underlying position sensing circuitry senses both the direction and velocity of finger movement along the pad and responsively generates the combination direction/velocity output signal useable to correspondingly reposition the cursor on the computer display screen.

Despite their growing acceptance as cursor repositioning devices, both the pointing stick and the touch pad have a variety of well known problems, limitations and disadvantages. For example, the pointing stick can be difficult to control, and can be fatiguing due to the requirement that the finger force be potentially applied thereto in all horizontal directions to achieve cursor repositioning movement through a full 360 degree arc on the display screen. Additionally, significant effort is typically required to stay in contact with the force-receiving upper end of the pointing stick.

The touch pad, on the other hand, while requiring less force to use than the pointing stick, can require multiple finger passes along its outer side surface to achieve the desired screen distance of the cursor repositioning travel. Moreover, because of this, the use of the touch pad can require more user arm movement and thus more readily cause user fatigue. Additionally, it can be difficult to accurately correlate finger speed to desired cursor movement speed on the display screen.

In view of the foregoing it can readily be seen that it would be desirable to provide an improved cursor control device that eliminates, or at least substantially reduces, the above-mentioned problems, limitations and disadvantages typically associated with the conventional types of cursor control devices as generally described above. It is accordingly an object of the present invention to provide such an improved cursor control device.

SUMMARY OF THE INVENTION

In carrying out principles of the present invention, in accordance with a preferred embodiment thereof, an electronic device having a display screen upon which a movable cursor may be generated is provided with specially designed rotary cursor control apparatus operative to reposition the cursor in a selectively variable direction and a selectively variable velocity along the display screen. Representatively, the electronic apparatus is a portable computer.

The cursor control apparatus includes a support structure, and a control member carried on the support structure for rotation relative thereto about an axis. The control member is manually engageable, at a selectively variable engagement location thereon spaced apart a transverse distance from the axis and correlated to a desired cursor repositioning velocity along the display screen, by a user of the apparatus and rotated relative to the support structure about the axis to a rotational orientation correlated to a desired cursor repositioning direction on the display screen.

Position sensing means are provided for sensing the aforementioned transverse distance and rotational orientation and responsively generating an output signal indicative of both the transverse distance and rotational orientation. Additionally, cursor moving means are provided for utilizing the output signal to reposition the cursor in the desired direction and at the desired velocity along the display screen.

In one illustrated embodiment of the invention the electronic device is a notebook computer having a base housing portion in which the cursor control apparatus is integrally incorporated. In another illustrated embodiment of the invention the electronic device is also a notebook computer having a base housing portion, but the cursor control apparatus is a "stand alone" device carried on its own housing structure separate and apart from the computer's base housing.

In a preferred embodiment of the invention, the support structure is a wall member, and the cursor control member has a generally disc-shaped configuration and an exposed outer side surface in which a radially extending depression is formed. The depression has radially opposite inner and outer ends and is configured to receive a portion of a finger of a user of the apparatus, at a selectively variable radial engagement location along the depression, to facilitate manual rotation of the control member about the axis relative to the wall member.

The position sensing means, representatively capacitance-based positioning electronic circuitry, are operative to sense the radial position of the engagement location during contact thereof by the user's finger, and the output signal from the positioning sensing means has a cursor repositioning velocity component with a magnitude directly proportional to the radial distance of the engagement location away from the rotational axis of the control member.

DETAILED DESCRIPTION

Figure 1:
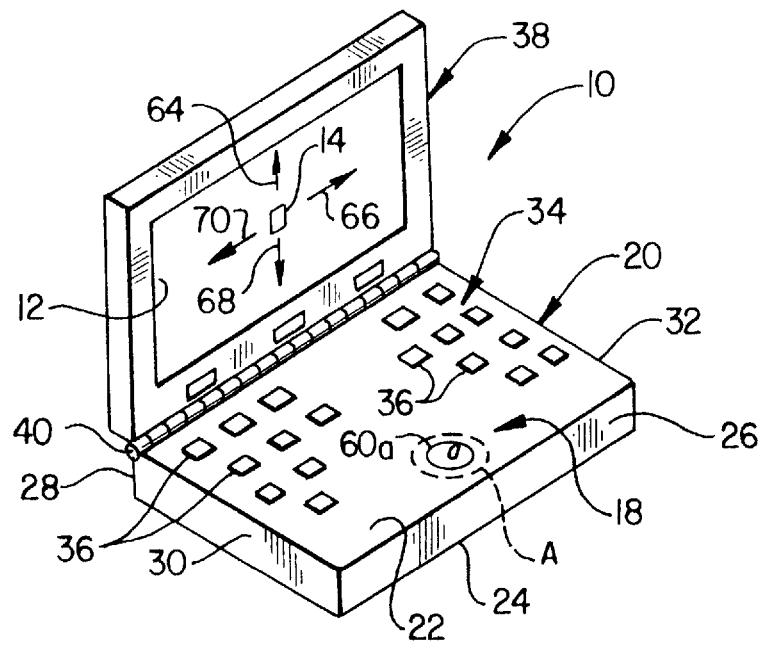
FIG. 1 is a simplified perspective view of an electronic device, representatively a notebook computer, having an integrated rotary display screen cursor position control device embodying principles of the present invention.
Figure 3:
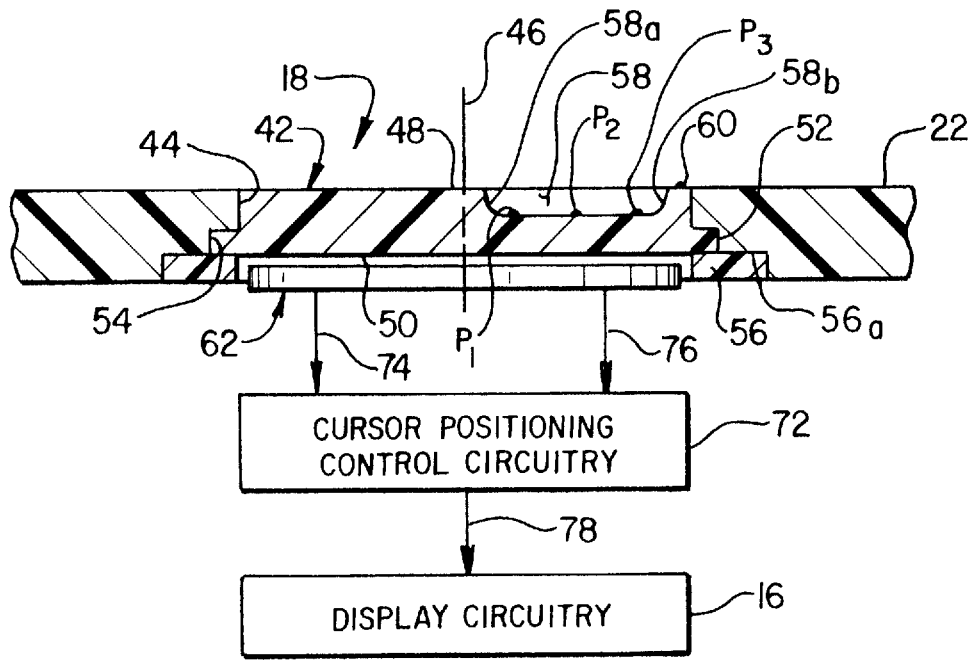
FIG. 3 is a cross-sectional view through the rotary cursor control device, taken along line 3—3 of FIG. 2, and further illustrating in schematic form associated electronic cursor positioning circuitry.

Perspectively illustrated in FIG. 1 is an electronic device, representatively a portable notebook computer 10, having a screen 12 upon which a moveable cursor 14 may be generated using conventional display circuitry 16 (see FIG. 3). The present invention uniquely incorporates in the computer 10 specially designed rotary cursor control apparatus 18 that may be conveniently and quite easily used in a manner subsequently described herein to reposition the cursor 14 on the display screen 12 in a selectively variable direction thereon, and at a selectively variable repositioning velocity.

While the cursor control apparatus 18 is representatively illustrated and described herein as being operatively associated with a notebook computer, it will be readily appreciated by those of skill in this particular art that it could also be used to advantage with other electronic devices with display screens such as, for example, calculators and other types of computers.

Notebook computer 10 representatively includes a rectangular base housing 20 having top and bottom side walls 22 and 24; front and rear side walls 26 and 28; and left and right end walls 30 and 32. A keyboard assembly 34, having a spaced series of individual depressible key members 36, is operatively positioned along a rear portion of the top base housing side wall 22. Representatively, the rotary cursor control apparatus 18 is centrally positioned on the top side wall 22 in front of the keyboard assembly 34.

A rectangular lid housing 38, having the display screen 12 mounted on its front or inner side, is pivotally secured to a top rear corner section of the base housing 20, by a suitable hinge structure 40, for movement relative thereto between the indicated upwardly pivoted open use position and a downwardly pivoted closed storage/transport orientation (not shown) in which the lid housing 38 extends across and covers the top base housing side wall 22.

Figure 2:
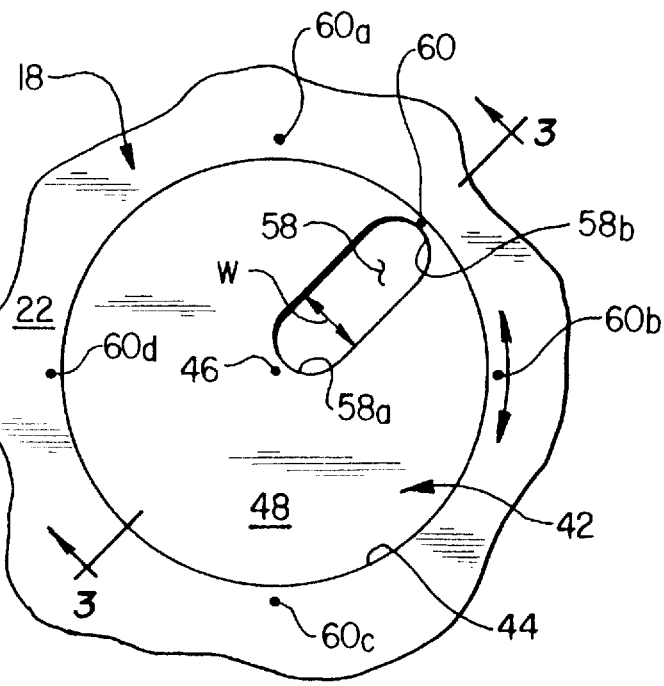
FIG. 2 is an enlarged scale top plan view of the circled area "A" in FIG. 1 and illustrates an exposed outer side portion of the rotary cursor control device.

Turning now to FIGS. 2 and 3, the rotary cursor control apparatus 18 includes a control disc member 42 captively retained in a complementarily configured circular opening 44 in the top base housing side wall 22 for rotation relative thereto about a vertical axis 46 transverse to the wall 22. Control disc member 42, like the top base housing side wall 22, is representatively formed from a suitable molded plastic material and has a top side 48 generally flush with the top side of the top base housing side wall 22, a bottom side 50, and an annular, radially outwardly projecting bottom side mounting flange 52.

Representatively, the control disc member 42 is captively and rotatably retained within its associated base housing wall opening 44 by the sliding receipt of the mounting flange 52 in an annular mounting groove 54 formed around the peripheral side surface of the opening 44 and partially bounded by an annular retaining plate member 56 removably snapped into a corresponding annular depression 56a formed in the underside of the top base housing wall 22.

For purposes later described, a radially extending depression 58 is formed in the top side 48 of the control disc member 42, between its rotational axis 46 and the outer periphery of the disc member, and has a width W sufficient to permit the depression 58 to receive a tip portion of a user's finger. The disc depression 58 has a radially inner end 58a, and a radially outer end 58b.

Representatively, a suitable rotational alignment mark 60 is formed on the top side 48 of the disc 42 radially outwardly of the outer depression end 58b. By appropriately rotating the disc 42 as subsequently described herein, mark 60 may be circumferentially brought into alignment with associated alignment marks 60a,60b,60c and 60d formed on the upper side of the top base housing side wall 22 and mutually spaced ninety degrees apart from one another in a circumferential direction relative to the disc 42.

As schematically depicted in FIG. 3, the rotary cursor control apparatus 18 also includes position sensing circuitry 62 that underlies the bottom side 50 of the control disc member 42. Representatively, the position sensing circuitry 62 is of a known construction and operation typically incorporated into a conventional stationary touch pad type of cursor position control device and functions to sense the position of a user's finger that operatively touches the device. Basically, such circuitry generates capacitance flux fields that are blocked or disturbed by the user's finger, with the circuitry sensing the flux disturbance location and responsively generating an output signal related in a predetermined manner to such flux disturbance/blockage location.

With reference now to FIGS. 1–3, to operate the cursor control apparatus 18 in a manner selectively repositioning the cursor 14 on the display screen 12 (see FIG. 1), the user places a finger in the disc depression 58 and rotates the disc 42 relative to its supporting structure (e.g., the top base housing side wall 22) until the outer end 58b of the depression 58 horizontally points in a direction corresponding to the desired repositioning movement direction for the cursor 14 on the display screen 12. For example, the alignment mark 60a on the top base housing side wall 22 is representatively positioned thereon (see FIG. 1) between the cursor control apparatus 18 and the keyboard assembly 34 so that when the disc mark 60 is rotationally aligned with the stationary housing mark 60a the desired cursor repositioning direction is "up" on the screen 12 (indicated by the movement arrow 64 in FIG. 1). In a similar fashion, by respectively aligning the disc mark 60 with the housing marks 60b,60c and 60d (see FIG. 2) the selected cursor repositioning direction respectively corresponds to the screen movement arrows 66,68 and 70 on the screen 12 (see FIG. 1).

The radially extending disc depression 58 facilitates the manual engagement of the control disc member 42 and its rotation relative to its associated support structure (i.e., the top base housing side wall 22), and further provides the user with both a visual and a touch-based indication of the relative rotational orientation of the disc relative to its supporting wall 22, and thus a continuous indication of the selected direction of cursor repositioning movement on the display screen 12. During use of the rotary cursor position control apparatus 18, the underlying circuitry 62 continuously monitors the rotational orientation of the disc 42 relative to the top base housing side wall 22 (by monitoring the rotational capacitance flux-disturbance location of the engaging finger relative to the stationary circuitry 62) and responsively transmits to the computer's cursor positioning control circuitry 72 a directional control signal 74 indicative of the user-selected cursor repositioning direction.

While the position sensing circuitry 62 has been representatively illustrated as capacitance-type circuitry of the type typically utilized in cursor repositioning touch pad apparatus, it will be readily appreciated by those of skill in this particular art that such circuitry could be of a variety of other types such as, for example, thermal position sensing circuitry to sense operating finger position on the disc 42, or magnet and cooperating Hall effect sensor circuitry carried on the disc and underlying position sensing structure.

In addition to providing disc-rotating leverage for the user's finger inserted therein, the disc depression 58 also permits the user to very easily impart to the cursor 14 a selectively variable velocity in the chosen repositioning direction on the display screen 12. This is accomplished by the user simply by varying the radial positioning in the depression 58 of his disc-rotating finger. Specifically, the further radially outwardly toward the depression end 58b the user places his finger in the depression 58 the greater the selected cursor repositioning velocity, and vice versa. For example, with reference to FIG. 3, if the user places his finger on point P1 within the depression 58 a minimum cursor velocity is selected. If he places his finger on point P3, a maximum cursor velocity is selected, and if he places his finger on point P2 an intermediate cursor velocity is selected.

The underlying circuitry 62 senses the radial position of the user's inserted disc-rotating finger relative to the disc's rotational axis 46 and responsively transmits to the cursor positioning control circuitry 72 a velocity control signal 76 indicative of such radial position and thus of the selected cursor repositioning velocity. The circuitry 72 responsively transmits to the display circuitry 16 a combined direction/velocity signal 78 used to reposition the cursor 14 in the selected direction and velocity on the display screen 12. If desired, a suitable delay may be built into the circuitry 62,72,16 between the engagement of the disc 42 by the user's finger and the actual movement of the cursor.

Figure 4:
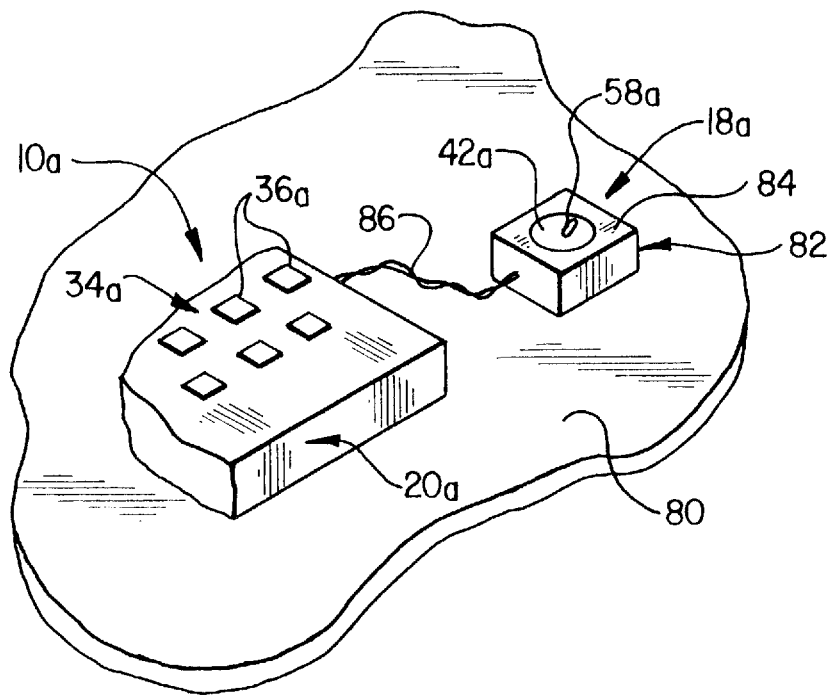
FIG. 4 is a simplified perspective view of an alternate stand-alone external embodiment of the rotary cursor control device.

In FIGS. 1–3 the rotary cursor control apparatus 18 has been representatively illustrated as being integrally incorporated in the computer 10. Alternatively, however, the rotary cursor control apparatus could be fabricated as a "stand alone" unit, such as the cursor control apparatus 18a shown in FIG. 4 used in conjunction with a portable computer 10a having a base housing 20a supported on a horizontal work surface 80, such as a desk top.

The alternate rotary cursor control apparatus 18a includes a support structure, separate from the base housing 20a, such as the small control housing 82 resting on the work surface 80. The rotatable disc portion 42a, with its radially extending top side depression 58a is rotatably supported on the top side wall 84 of the housing 82, and overlies position sensing circuitry (of the same construction and operation as that shown at 62 in FIG. 3) disposed within the housing 82 and electrically coupled to corresponding cursor control circuitry in the base housing 20a by electrical wiring 86.

Compared to pointing stick and touch pad devices conventionally utilized to selectively reposition a display screen cursor, the rotary cursor control apparatus of the present invention provides a variety of advantages. For example, compared to a pointing stick device, the rotary cursor control apparatus requires much less force to use, is easier to control from both cursor direction and cursor velocity standpoints, and is easier for the user to engage. Compared to a touch pad, the rotary cursor control apparatus does not require repeated finger passes therealong to move the cursor large distances across the screen, and provides a more precise control of cursor repositioning velocity since such velocity is not dependent upon finger velocity along the repositioning device.

The foregoing detailed description is to be clearly understood as being given by way of illustration and example only, the spirit and scope of the present invention being limited solely by the appended claims.

What is claimed is:

1. Electronic apparatus comprising:

a display screen upon which a cursor may be generated; and cursor control apparatus for repositioning said cursor on said display screen in a selectively variable direction and at a selectively variable velocity thereon, said cursor control apparatus including:

a support structure, a control member carried on said support structure for rotation relative thereto about an axis, said control member being manually engageable, at a selectively variable engagement location spaced apart a transverse distance from said axis correlated to a desired cursor repositioning velocity along said display screen, by a user of the electronic apparatus and rotated relative to said support structure about said axis to a rotational orientation correlated to a desired cursor repositioning direction on said display screen, position sensing means for sensing said transverse distance and said rotational orientation and responsively generating an output signal indicative of said transverse distance and said rotational orientation, and cursor moving means for utilizing said output signal to reposition the cursor in the desired direction and at the desired velocity along said display screen.

2. The electronic apparatus of claim 1 wherein said electronic apparatus includes a computer with which said display screen is operatively associated.

3. The electronic apparatus of claim 2 wherein said computer is a portable computer.

4. The electronic apparatus of claim 3 wherein said portable computer is a notebook computer.

5. The electronic apparatus of claim 1 wherein:

said support structure is a wall member having an opening disposed therein and outwardly circumscribing said axis, and said control member has a generally disc-shaped configuration and is rotationally supported in said opening with said axis extending transversely through a radially central portion of said control member.

6. The electronic apparatus of claim 5 wherein:

said electronic apparatus includes a housing structure on which a keyboard assembly is supported, said housing structure being defined in part by said wall member.

7. The electronic apparatus of claim 5 wherein said electronic apparatus includes:

a first housing structure on which a keyboard assembly is supported, and a separate second housing structure defined in part by said wall member.

8. The electronic apparatus of claim 5 wherein:

said generally disc-shaped control member has an exposed outer side surface in which a radially extending depression is formed, said depression having radially opposite inner and outer ends and being configured to receive a portion of a finger of a user of said electronic apparatus, at a selectively variable radial engagement location along said depression, to facilitate manual rotation of said control member about said axis relative to said wall member, said position sensing means are operative to sense the radial position of said engagement location during contact thereof by the user's finger, and said output signal has a cursor repositioning velocity component with a magnitude directly proportional to the radial distance of said engagement location away from said axis.

9. The electronic apparatus of claim 1 wherein said position sensing means include capacitance-based position sensing circuitry disposed in an adjacent, facing relationship with said control member.

10. Cursor control apparatus for repositioning a cursor on a display screen of an electronic device in a selectively variable direction, and at a selectively variable velocity, along the display screen, said cursor control apparatus comprising:

a support structure;

a control member carried on said support structure for rotation relative thereto about an axis, said control member being manually engageable, at a selectively variable engagement location spaced apart a transverse distance from said axis correlated to a desired cursor repositioning velocity along the display screen, by a user of the apparatus and rotated relative to said support structure about said axis to a rotational orientation correlated to a desired cursor repositioning direction on the display screen; and position sensing means for sensing said transverse distance and said rotational orientation and responsively generating an output signal indicative of said transverse distance and said rotational orientation and being useable to reposition the cursor in the desired direction and at the desired velocity along the display screen.

11. The cursor control apparatus of claim 10 wherein:

said support structure is a wall member having an opening disposed therein and outwardly circumscribing said axis, and said control member has a generally disc-shaped configuration and is rotationally supported in said opening with said axis extending transversely through a radially central portion of said control member.

12. The cursor control apparatus of claim 11 wherein:

said generally disc-shaped control member has an exposed outer side surface in which a radially extending depression is formed, said depression having radially opposite inner and outer ends and being configured to receive a portion of a finger of a user of said electronic apparatus, at a selectively variable radial engagement location along said depression, to facilitate manual rotation of said control member about said axis relative to said wall member, said position sensing means are operative to sense the radial position of said engagement location during contact thereof by the user's finger, and said output signal has a cursor repositioning velocity component with a magnitude directly proportional to the radial distance of said engagement location away from said axis.

13. The cursor control apparatus of claim 12 wherein said position sensing means include capacitance-based position sensing circuitry disposed in an adjacent, facing relationship with said control member.

14. A computer comprising:

a housing structure having an exterior wall portion;

a keyboard supported on said exterior wall portion;

a display screen upon which a moveable cursor may be generated;

a generally disc-shaped cursor control member supported on said exterior wall portion for rotation relative thereto about an axis extending transversely through a radially central portion of said control member, said cursor control member having an exposed outer side surface in which a radially extending depression is formed, said depression having radially opposite inner and outer ends and being configured to receive a portion of a finger of a user of said computer, at a selectively variable radial engagement location along said depression correlated to a desired cursor repositioning velocity along said display screen, to facilitate manual rotation of said control member about said axis to a selectively variable rotational orientation relative to said exterior wall portion and correlated to a desired cursor repositioning direction along said display screen;

position sensing means for sensing said rotational orientation of said control member, and the radial position of said engagement location, and responsively generating an output signal having a first component indicative of said rotational orientation, and a second component indicative of the radial orientation in said depression of said engagement location; and cursor moving means for utilizing said output signal to reposition the cursor in said desired direction and at said desired velocity.

15. The computer of claim 14 wherein said position sensing means include capacitance-based position sensing circuitry disposed in an adjacent, facing relationship with said control member.

16. A computer comprising:

a first housing structure having a first exterior wall portion;

a keyboard supported on said first exterior wall portion;

a display screen upon which a moveable cursor may be generated;

a second housing structure having a second exterior wall portion;

a generally disc-shaped cursor control member supported on said second exterior wall portion for rotation relative thereto about an axis extending transversely through a radially central portion of said control member, said cursor control member having an exposed outer side surface in which a radially extending depression is formed, said depression having radially opposite inner and outer ends and being configured to receive a portion of a finger of a user of said computer, at a selectively variable radial engagement location along said depression correlated to a desired cursor repositioning velocity along said display screen, to facilitate manual rotation of said control member about said axis to a selectively variable rotational orientation relative to said second exterior wall portion and correlated to a desired cursor repositioning direction along said display screen;

position sensing means for sensing said rotational orientation of said control member, and the radial position of said engagement location, and responsively generating an output signal having a first component indicative of said rotational orientation, and a second component indicative of the radial orientation in said depression of said engagement location; and cursor moving means for utilizing said output signal to reposition the cursor in said desired direction and at said desired velocity.

17. The computer of claim 16 wherein said position sensing means include capacitance-based position sensing circuitry disposed in an adjacent, facing relationship with said control member.

\* \* \* \* \*